Patented July 10, 1951

2,559,635

UNITED STATES PATENT OFFICE 2,559,635

POLYMERS OF ALKYL α-ACYLOXY-ACRYLATES

William O. Kenyon, Thomas T. M. Laakso, and Cornelius C. Unruh, Rochester, N. Y., assignors to Eastman Kodak Company, Rochester, N. Y., a corporation of New Jersey No Drawing. Application March 1, 1950, Serial No. 147,161

18 Claims. (Cl. 260—85.5)

This application relates to new interpolymers of alkyl α-acyloxyacrylates, and to a process for obtaining them.

This application is a continuation-in-part of our application Serial No. 776,154, filed September 25, 1947, now U. S. Pat. No. 2,499,343, dated March 7, 1950.

Spence & Degering U. S. Patent 2,407,302, dated September 10, 1946, shows that esters of α-acyloxyacrylic acids can be prepared by reacting a ketene with an ester of pyruvic acid, however, a reaction mixture which is difficult to separate into its component parts usually results. The products so prepared are obtained in low yields and are homopolymerized with extreme difficulty. In our application Serial No. 776,154 (U. S. Patent 2,499,393), we have shown a new process for preparing these esters, which are obtained in high yields and can be homopolymerized without difficulty. We have also shown in that application that certain interpolymers can be obtained from these esters of α-acyloxyacrylic acids.

We have now found that some of these interpolymers are characterized by unique solubility properties in organic solvents, and are readily adaptable for certain purposes such as molding. For example, while both polystyrene and polyethyl α-acetoxyacrylate are insoluble in acetone, we have found that certain interpolymers prepared from the respective monomers of these homopolymers can be readily dissolved in acetone.

We have observed further that the homopolymers of alkyl α-acyloxyacrylates are not readily adaptable to molding, since their softening temperatures are generally above their decomposition temperatures. The use of plasticizers to cure this difficulty has not proved to be especially efficacious, since the plasticizers in many instances undergo decomposition themselves, causing discoloration. The interpolymerization properties of these alkyl α-acyloxyacrylates are also of some interest, in some instances interpolymers being readily formed, while in others it being doubtful that interpolymers actually form. In some instances, there seems to be evidence that the alkyl α-acyloxyacrylates slow the rate of polymerization of the other monomer.

However, we have found that within certain ranges of proportions styrene, methyl, α-methacrylate, and acrylonitrile form valuable interpolymers with the alkyl α-acyloxyacrylates of our prior application.

It is, therefore, an object of our invention to provide new interpolymers of alkyl α-acyloxyacrylates.

A further object is to provide new methods for preparing these interpolymers.

Still another object is to provide shaped articles prepared from our new interpolymers, Other objects will become apparent from a consideration of the following description and examples.

According to our invention we prepare our new interpolymers by heating in the presence of a peroxide polymerization catalyst a mixture selected from the group consisting of a mixture containing from 10 to 60 per cent by weight of the alkyl α-acyloxyacrylate and from 90 to 40 per cent by weight of styrene, a mixture containing from 10 to 90 per cent by weight of the alkyl α-acyloxyacrylate and from 90 to 10 per cent by weight of methyl α-methacrylate, and a mixture containing from 10 to 40 per cent by weight of the alkyl α-acyloxyacrylate and from 90 to 60 per cent by weight of acrylonitrile.

The alkyl α-acyloxyacrylates which can be used in our invention can be represented by the following general formula:

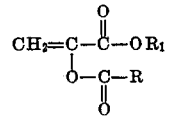

wherein R represents an alkyl group, such as methyl, ethyl, n-propyl, and isopropyl (i. e. an alkyl group of the formula $C_nH_{2n+1}$ wherein $n$ represents a positive integer of from 1 to 3) and $R_1$ represents an alkyl group, such as methyl, ethyl, n-propyl, isopropyl, n-butyl, isobutyl, etc. (i. e. an alkyl group of the formula $C_nH_{2n+1}$) wherein $n$ represents a positive integer from 1 to 4. Typical esters include methyl, ethyl, n-propyl, isopropyl, n-butyl, isobutyl, etc. α-acetoxyacrylates; methyl, ethyl, n-propyl, isopropyl, n-butyl, isobutyl, etc. α-n-propionoxyacrylates; and methyl, ethyl, n-propyl, isopropyl, n-butyl, isobutyl, etc. α-n-butyroxyacrylates and α-isobutyroxyacrylates. As mentioned above, our application Serial No. 776,154 (U. S. Patent 2,499,393) discloses a method for making these alkyl α-acyloxyacrylates. Still another method is described in the copending application Serial No. 775,144, filed September 19, 1947, now U. S. Patent 2,499,392, dated March 7, 1950, of William O. Kenyon and Cornelius C. Unruh. Still another method for preparing these esters is set forth in the copending application Serial No. 22,504, filed April 21, 1948, now U. S. Patent 2,514,672, dated July 11, 1950, of William O. Kenyon and Delbert D. Reynolds.

Polymerization catalysts which can be used in our invention include the organic peroxides ( e. g. benzoyl peroxide, acetyl peroxide, acetyl benzoyl peroxide, lauroyl peroxide, oleoyl peroxide, acetone peroxide, urea peroxide, etc.), hydrogen peroxide, alkali metal perborates (e. g. sodium and potassium perborates), alkali metal persulfates (e. g. sodium and potassium persulfates), ammonium persulfate, ammonium perborate, etc.

Temperatures varying from about room temperature (20°–25° C.) to about 65° C. have been found to be especially efficacious in practicing our invention, although higher temperatures can be used, if desired.

The polymerization can be carried out by the bead or emulsion method in which water, or some other medium in which the monomers are insoluble, is employed as a dispersing medium, with or without emulsifying agents. The polymerization can also be performed by use of a solvent which dissolves the monomers, but not the polymer, which precipitates from the solution as it forms. Alternatively, the diluent or solvent, such as benzene, toluene, xylene, 1,4-dioxane, acetonitrile, acetone, N,N-dimethylformamide, succinonitrile, glycolonitrile (formaldehyde cyanohydrin), etc. can be a solvent for the polymer. The polymerization can also be carried out by the mass method.

The following examples illustrate further the manner whereby we practice our invention.

*Example 1.—Interpolymer of methyl α-methacrylate and ethyl α-acetoxyacrylate*

15.8 gms. of ethyl α-acetoxyacrylate, 10.0 gms. of methyl α-methacrylate, and 0.13 gm. of benzoyl peroxide were placed in a sealed glass tube under an atmosphere of nitrogen and the tube placed in a constant temperature water bath maintained at 50° C. After three days a clear, hard resin was formed, which was dissolved in acetone. This solution was then poured into an excess of methanol, the resulting precipitate redissolved in acetone, and the resulting solution poured into hot water. After drying the reprecipitated product at 50° C., a yield of 24 gms. of copolymer was obtained. The acetyl content of the copolymer was found by distillation to be 14.7%, representing a molar ratio of methyl α-methacrylate to ethyl α-acetoxyacrylate of approximately 1.5:1 in the copolymer.

*Example 2.—Interpolymer of styrene and ethyl α-acetoxyacrylate*

15.8 gms. of ethyl α-acetoxyacrylate, 10.4 gms. of styrene and 0.13 gm. of benzoyl peroxide were placed in a sealed ampoule under an atmosphere of nitrogen. The ampoule was placed in a constant temperature bath maintained at 50° C., and after 6 days a hard, clear resin was formed. This was dissolved in 1,4-dioxane, the solution poured into an excess of stirred methanol. The precipitate was again dissolved in 1,4-dioxane, and the solution poured into an excess of hot water. After the resulting precipitate was dried at 50° C., a yield of 24 gms. of copolymer was obtained. The ethoxyl (C₂H₅O—) content of the copolymer was found to be 16.6%, indicating a molar ratio of styrene to the ethyl α-acetoxyacrylate of approximately 1.1:1 in the copolymer.

*Example 3.—Interpolymer of methyl α-methacrylate and ethyl α-n-butyroxacrylate*

9.3 gms. of ethyl α-butyroxyacrylate, 5.0 gms. of methyl α-methacrylate, and 0.072 gm. of benzoyl peroxide were sealed together in a glass ampoule under an atmosphere of nitgrogen. The ampoule was then placed in a constant temperature bath maintained at 50° C. After 3 days a clear, colorless, hard resin was formed.

*Example 4.—Interpolymer of styrene and ethyl α-n-butyroxyacrylate*

9.3 gms. of ethyl α-butyroxyacrylate, 5.2 gms. of styrene, and 0.072 gm. of benzoyl peroxide were sealed together in a glass tube under an atmosphere of nitgrogen. The tube was placed in a constant temperature bath maintained at 50° C. After 7 days a clear, colorless, and hard resin was formed.

*Example 5.—Interpolymer of styrene and isobutyl α-acetoxyacrylate*

9.3 gms. of isobutyl α-acetoxyacrylate, 5.2 gms. of styrene, and 0.072 gm. of benzoyl peroxide were placed in a sealed glass tube under an atmosphere of nitrogen. The tube was placed in a constant temperature bath maintained at 50° C. After 7 days a clear, colorless, and hard resin had formed.

*Example 6.—Interpolymer of methyl α-methacrylate and isobutyl α-acetoxyacrylate*

9.3 gms. of isobutyl α-acetoxyacrylate, 5.0 gms. of methyl α-methacrylate, and 0.072 gm. of benzoyl peroxide were sealed together in a glass ampoule under an atmosphere of nitrogen and placed in a 50° C. bath maintained at constant temperature. After 3 days a clear, colorless, and hard resin was formed.

In a manner similar to that shown in Example 2 above, the amounts of styrene, ethyl α-acetoxyacrylate, and benzoyl peroxide shown in the table below were heated together at the temperature indicated for 90 hours in each instance. The appearance of the product and the yield thereof are also shown. The products were separated from the reaction mixture as shown in Example 2.

TABLE I

| Ex. | Wt. Styrene | Wt. Ethyl α-Acetoxy-acrylate | Wt. Benzoyl Peroxide | Temp. | Appearance of Product | Yield |
|---|---|---|---|---|---|---|
| | Grams | Grams | Grams | °C. | | Grams |
| 7 | 45 | 5 | 0.25 | 55 | Hard, clear, colorless | 48 |
| 8 | 40 | 10 | 0.25 | 55 | -----do----- | 45 |
| 9 | 30 | 20 | 0.25 | 55 | -----do----- | 45 |
| 10 | 20 | 30 | 0.25 | 55 | -----do----- | 48 |
| 11 | 5.2 | 7.9 | 0.13 | 100 | -----do----- | 11.5 |

Acrylonitrile, ethyl α-acetoxyacrylate, and benzoyl peroxide in the amounts shown in Table II below, were dissolved in acetonitrile and sealed together in a glass tube under an atmosphere of nitrogen. The tubes were then heated in a water bath at 55° C. for 96 hours. The products obtained in Examples 12 and 13 were dissolved in N,N-dimethylformamide, and the solutions poured into an excess of methanol. After leaching the precipitates with methanol for 16 hours, they were dried at 55° C.

The reaction mixture obtained in Example 14 was diluted with acetone, and then poured into an excess of methanol. The precipitate was dissolved in acetone and poured into an excess of distilled water. The white fibrous precipitate was dried at 55° C.

TABLE II

| Ex. | Wt. Acrylonitrile | Wt. Ethyl α-Acetoxyacrylate | Wt. Benzoyl Peroxide | cc. Acetonitrile | Appearance of Product | Yield |
|---|---|---|---|---|---|---|
| | Grams | Grams | Grams | | | Grams |
| 12 | 9 | 1 | 0.025 | 7.5 | Amber, opaque, tough | 9.5 |
| 13 | 8 | 2 | 0.025 | 7.5 | ----do---- | 9.0 |
| 14 | 6 | 4 | 0.025 | 7.5 | Amber, hazy, soft | 9.0 |

Methyl α-methacrylate, ethyl α-acetoxyacrylate, and benzoyl peroxide were heated together at 55° C. on a water bath for 48 hours in a manner similar to that shown in Example 1. The products were recovered as described in Example 1 and the results are shown in Table III below.

TABLE III

| Ex. | Wt. Methyl α-Methacrylate | Wt. Ethyl α-Acetoxyacrylate | Wt. Benzoyl Peroxide | Appearance after 24 hours | Yield |
|---|---|---|---|---|---|
| | Grams | Grams | Grams | | Grams |
| 15 | 1 | 9 | 0.05 | Clear, hard, colorless | 9.5 |
| 16 | 2 | 8 | 0.05 | ----do---- | 9.5 |
| 17 | 4 | 6 | 0.05 | ----do---- | 9.5 |
| 18 | 6 | 4 | 0.05 | ----do---- | 9.5 |
| 19 | 8 | 2 | 0.05 | ----do---- | 9.5 |
| 20 | 9 | 1 | 0.05 | ----do---- | 9.5 |

*Example 21.—Solution interpolymerization of styrene and ethyl α-acetoxyacrylate*

7.9 gms. of ethyl α-acetoxyacrylate and 5.2 gms. of styrene were dissolved in 20 cc. of dry 1,4-dioxane in a glass tube and 0.065 gm. of benzoyl peroxide added. The tube was sealed with the contents under a nitrogen atmosphere, and then heated at 55° C. for 5 days. The clear, colorless, viscous mass was diluted with acetone and poured into excess methanol. It was again dissolved in acetone and poured into distilled water, whereupon a white, fibrous product precipitated.

*Example 22.—Interpolymer of styrene and n-butyl α-acetoxyacrylate*

18.6 gms. of n-butyl α-acetoxyacrylate, 10.4 gms. of styrene, and 0.15 gm. of benzoyl peroxide were sealed together in a glass tube under an atmosphere of nitrogen. After heating the tube at 55° C. in a water bath for 72 hours, the contents of the tube had set to a hard, clear, colorless mass, which was dissolved in acetone. This solution was poured into rapidly-stirred excess methanol, and the resulting precipitate was redissolved in acetone and then poured into distilled water. After the white, fibrous precipitate was dried in an oven at 55° C., 28.5 gms. of product were obtained.

*Example 23.—Bead interpolymerization of styrene and ethyl α-acetoxyacrylate*

A solution of 7.9 gms. of ethyl α-acetoxyacrylate, 5.2 gms. of styrene, and 0.065 gm. of benzoyl peroxide was mixed with 35 cc. of a one per cent solution of gum arabic in water. The mixture was placed in a closed glass vessel and tumbled in a 50° C. water bath for 3 days. On opening the vessel, the small transparent beads were separated and dissolved in 1,4-dioxane. The polymer was precipitated by pouring into excess methanol with vigorous stirring. The precipitate was dissolved in acetone and recovered by pouring the solution into an excess of distilled water. The white, fibrous precipitate was dried at 50° C.

*Example 24.—Interpolymer of acrylonitrile and n-butyl α-acetoxyacrylate*

2.5 gms. of n-butyl α-acetoxyacrylate, 10.0 gms. of acrylonitrile, 18.7 gms. of acetonitrile, and 0.031 gm. of benzoyl peroxide were sealed in a glass tube under nitrogen, and heated at 55° C. for 6 days. The slightly hazy, light brown, gelatinous mass was dissolved in N,N-dimethylformamide, and the solution filtered. The light tan solution was poured into an excess of well-stirred methanol, and the resulting precipitate was leached for several hours with fresh methanol (2 changes) and then dried at 55° C. There were obtained 8 gms. of product containing 19.1 per cent nitrogen, corresponding to 72.3 per cent acrylonitrile in the interpolymer.

*Example 25.—Interpolymer of methyl α-methacrylate and n-butyl α-acetoxyacrylate*

18.6 gms. of n-butyl α-acetoxyacrylate, 10.0 gms. of methyl α-methacrylate and 0.15 gm. of benzoyl peroxide were sealed in a glass tube under nitrogen and the tube placed in a water bath at 55° C. After 24 hours a hard, clear, and colorless mass was obtained which was dissolved in acetone. The solution was poured into excess methanol and the resulting precipitate was dissolved in acetone. This solution was poured into distilled water and the white, fibrous precipitate was dried in an oven at 55° C. It weighed 25.5 gms.

Several of the polymers obtained in the above examples were molded in a standard molding press, using steel molds, under a pressure of about 8 tons for 2 minutes. The molding temperatures and the appearance of the products after molding are shown in Table IV below.

TABLE IV

| Polymer of Example | Alkyl α-Acyloxyacrylate | | Second Monomer | | Temp. | Appearance |
|---|---|---|---|---|---|---|
| | Type | Per cent | Type | Per cent | °C. | |
| 10 | EAA | 60 | Styrene | 40 | 140 | Clear, colorless. |
| 9 | EAA | 40 | do | 60 | 140 | Do. |
| 8 | EAA | 20 | do | 80 | 120 | Do. |
| 7 | EAA | 10 | do | 90 | 150 | Do. |
| 23 | EAA | 60 | do | 40 | 120 | Do. |
| 12 | EAA | 10 | Acrylonitrile | 90 | 160 | Clear, amber. |
| 13 | EAA | 20 | do | 80 | 150 | Do. |
| 14 | EAA | 40 | do | 60 | 150 | Clear, sl. yellow |
| 15 | EAA | 90 | MMA | 10 | 140 | Clear, colorless |
| 16 | EAA | 80 | MMA | 20 | 140 | Do. |
| 17 | EAA | 60 | MMA | 40 | 120 | Do. |
| 18 | EAA | 40 | MMA | 60 | 120 | Do. |
| 19 | EAA | 20 | MMA | 80 | 120 | Do. |
| 20 | EAA | 10 | MMA | 90 | 130 | Do. |
| 22 | BAA | 64.1 | Styrene | 35.9 | 100 | Do. |
| 25 | BAA | 65.0 | MMA | 35 | 100 | Do. |
| 24 | BAA | 20 | Acrylonitrile | 20 | 120 | Clear, amber. |

EAA = ethyl α-acetoxyacrylate.
BAA = n-butyl α-acetoxyacrylate.
MMA = methyl α-methacrylate.

The interpolymers of our invention can also be spun into fibers, cast into sheets, extruded into tubes, etc. Interpolymers can also be prepared from the alkyl α-acyloxyacrylates used above and other vinyl monomers such as acrylic acid, vinyl chloride, vinyl acetate, methyl acrylate, α-acetoxyacrylonitrile, monochlorostyrene, etc. However, these interpolymers do not generally exhibit the unique properties of the interpolymers disclosed in the above examples, and analysis of their compositions indicates in certain instances that a true interpolymer is not formed, but a mixture containing a small amount of interpolymer and some homopolymers.

What we claim as our invention and desire secured by Letters Patent of the United States is:

1. A resinous interpolymer of an alkyl α-acyloxyacrylate selected from those represented by the following general formula:

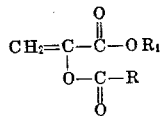

wherein R represents an alkyl group of the formula $C_nH_{2n+1}$ wherein $n$ represents a positive integer from 1 to 3 and $R_1$ represents an alkyl group of the formul $C_nH_{2n+1}$ wherein $n$ represents a positive integer from 1 to 4, selected from the group consisting of an interpolymer containing from 10 to 60 per cent by weight of the said alkyl α-acyloxyacrylate and from 90 to 40 per cent by weight of styrene, an interpolymer containing from 10 to 90 per cent by weight of the said alkyl α-acyloxyacrylate and from 90 to 10 per cent by weight of methyl α-methacrylate, and an interpolymer containing from 10 to 40 per cent by weight of the said alkyl α-acyloxyacrylate and from 90 to 60 per cent by weight of acrylonitrile.

2. A resinous interpolymer containing from 10 to 60 per cent by weight of an alkyl α-acyloxyacrylate selected from those represented by the following general formula:

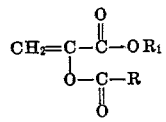

wherein R represents an alkyl group of the formula $C_nH_{2n+1}$ wherein $n$ represents a positive integer of from 1 to 3 and $R_1$ represents an alkyl group of the formula $C_nH_{2n+1}$ wherein $n$ represents a positive integer from 1 to 4, and from 90 to 40 per cent by weight of styrene 3. A resinous interpolymer containing from 10 to 90 per cent by weight of an alkyl α-acyloxyacrylate selected from those represented by the following general formula:

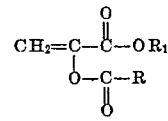

wherein R represents an alkyl group of the formula $C_nH_{2n+1}$ wherein $n$ represents a positive integer of from 1 to 3 and $R_1$ represents an alkyl group of the formula $C_nH_{2n+1}$ wherein $n$ represents a positive integer of from 1 to 4, and from 90 to 10 per cent by weight of methyl α-methacrylate.

4. A resinous interpolymer containing from 10 to 40 per cent by weight of an alkyl α-acyloxyacrylate selected from those represented by the following general formula:

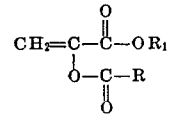

wherein R represents an alkyl group of the formula $C_nH_{2n+1}$ wherein $n$ represents a positive integer of from 1 to 3 and $R_1$ represents an alkyl group of the formula $C_nH_{2n+1}$ wherein $n$ represents a positive integer of from 1 to 4, and from 90 to 60 per cent by weight of acrylonitrile.

5. A resinous interpolymer containing from 10 to 60 per cent by weight of ethyl α-acetoxyacrylate and from 90 to 40 per cent by weight of styrene.

6. A resinous interpolymer containing from 10 to 90 per cent by weight of ethyl α-acetoxyacrylate and from 90 to 10 per cent by weight of methyl α-methacrylate.

7. A resinous interpolymer containing from 10 to 40 per cent by weight of ethyl α-acetoxyacrylate and from 90 to 60 per cent by weight of acrylonitrile.

8. A resinous interpolymer containing from 10 to 60 per cent by weight of n-butyl α-acetoxyacrylate and from 90 to 40 per cent by weight of styrene.

9. A resinous interpolymer containing from 10 to 90 per cent by weight of n-butyl α-acetoxyacrylate and from 90 to 10 per cent by weight of methyl α-methacrylate.

10. A process for preparing a resinous interpolymer of an alkyl α-acyloxyacrylate selected from those represented by the following general formula:

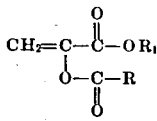

wherein R represents an alkyl group of the formula $C_nH_{2n+1}$ wherein $n$ represents a positive integer from 1 to 3 and $R_1$ represents an alkyl group of the formula $C_nH_{2n+1}$ wherein $n$ represents a positive integer from 1 to 4, comprising heating in the presence of a peroxide polymerization catalyst a mixture selected from the group consisting of a mixture of from 10 to 60 per cent by weight of the said alkyl α-acyloxyacrylate and from 90 to 40 per cent by weight of styrene, a mixture of from 10 to 90 per cent by weight of the said alkyl α-acyloxyacrylate and from 90 to 10 per cent by weight of methyl α-methacrylate, and a mixture of from 10 to 40 per cent by weight of the said alkyl α-acyloxyacrylate and from 90 to 60 per cent by weight of acrylonitrile.

11. A process for preparing a resinous interpolymer comprising heating in the presence of a peroxide polymerization catalyst a mixture consisting of from 10 to 60 per cent by weight of an alkyl α-acyloxyacrylate selected from those represented by the following general formula:

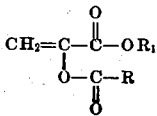

wherein R represents an alkyl group of the formula $C_nH_{2n+1}$ wherein $n$ represents a positive integer from 1 to 3 and $R_1$ represents an alkyl group of the formula $C_nH_{2n+1}$ wherein $n$ represents a positive integer from 1 to 4, and from 90 to 40 per cent by weight of styrene.

12. A process for preparing a resinous interpolymer comprising heating in the presence of a peroxide polymerization catalyst a mixture consisting of from 10 to 90 per cent by weight of an alkyl α-acyloxyacrylate selected from those represented by the following general formula:

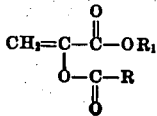

wherein R represents an alkyl group of the formula $C_nH_{2n+1}$ wherein $n$ represents a positive integer of from 1 to 3 and $R_1$ represents an alkyl group of the formula $C_nH_{2n+1}$ wherein $n$ represents a positive integer from 1 to 4, and from 90 to 10 per cent by weight of methyl α-methacrylate.

13. A process for preparing a resinous interpolymer comprising heating in the presence of a peroxide polymerization catalyst a mixture consisting of from 10 to 40 per cent by weight of an alkyl α-acyloxyacrylate selected from those represented by the following general formula:

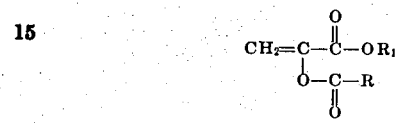

wherein R represents an alkyl group of the formula $C_nH_{2n+1}$ wherein $n$ represents a positive integer of from 1 to 3 and $R_1$ represents an alkyl group of the formula $C_nH_{2n+1}$ wherein $n$ represents a positive integer from 1 to 4, and from 90 to 60 per cent by weight of acrylonitrile.

14. A process for preparing a resinous interpolymer comprising heating in the presence of a peroxide polymerization catalyst a mixture consisting of from 10 to 60 per cent by weight of ethyl α-acetoxyacrylate and 90 to 40 per cent by weight of styrene.

15. A process for preparing a resinous interpolymer comprising heating in the presence of a peroxide polymerization catalyst a mixture consisting of from 10 to 90 per cent by weight of ethyl α-acetoxyacrylate and from 90 to 10 per cent by weight of methyl α-methacrylate.

16. A process for preparing a resinous interpolymer comprising heating in the presence of a peroxide polymerization catalyst a mixture consisting of from 10 to 40 per cent by weight of ethyl α-acetoxyacrylate and from 90 to 60 per cent by weight of acrylonitrile.

17. A process for preparing a resinous interpolymer comprising heating in the presence of a peroxide polymerization catalyst a mixture consisting of from 10 to 60 per cent by weight of n-butyl α-acetoxyacrylate and from 90 to 40 per cent by weight of styrene.

18. A process for preparing a resinous interpolymer comprising heating in the presence of a peroxide polymerization catalyst a mixture consisting of from 10 to 90 per cent by weight of n-butyl α-acetoxyacrylate and from 90 to 10 per cent by weight of methyl α-methacrylate.

WILLIAM O. KENYON.
THOMAS T. M. LAAKSO.
CORNELIUS C. UNRUH.

No references cited.